United States Patent [19]

Makibayashi et al.

[11] Patent Number: 4,706,947
[45] Date of Patent: Nov. 17, 1987

[54] VIBRATION PREVENTING DEVICE

[75] Inventors: Katsunori Makibayashi, Toyota; Kenji Murase, Suzuka; Motoo Kunihiro, Tsu, all of Japan

[73] Assignees: Toyo Tire & Rubber Co., Ltd.; Toyota Jidosha Kabushiki Kaisha, both of Japan

[21] Appl. No.: 882,141

[22] Filed: Jul. 3, 1986

[30] Foreign Application Priority Data

Jul. 5, 1985 [JP] Japan ................................ 60-146578

[51] Int. Cl.[4] ............................................ F16F 13/00
[52] U.S. Cl. ................................ 267/140.1; 180/300; 188/298; 243/562; 243/636
[58] Field of Search ............................ 267/8 R, 140.1; 188/298; 248/562, 632, 636; 180/300, 902

[56] References Cited

U.S. PATENT DOCUMENTS

| 2,421,585 | 6/1947 | Thiry | 267/8 R X |
| 2,555,347 | 6/1951 | Lee | 267/140.1 |
| 3,698,703 | 10/1972 | Hipsher | 267/140.1 X |
| 4,572,488 | 2/1986 | Holmberg, Jr. et al. | 267/8 R |

FOREIGN PATENT DOCUMENTS

| 37348 | 2/1984 | Japan | 267/140.1 |
| 1433772 | 4/1976 | United Kingdom | 267/140.1 |

Primary Examiner—George E. A. Halvosa
Attorney, Agent, or Firm—Parkhurst & Oliff

[57] ABSTRACT

This invention relates to multiple mounting vibration-preventing device wherein a partition wall is interposed between an upper plate and a lower plate. An upper vibration-preventing rubber member is interposed between the partition wall and the upper plate so as to define an upper damper liquid chamber therebetween. A lower vibration-preventing rubber member is interposed between the partition wall and the lower plate so as to define a lower damper liquid chamber therebetween. The upper damper liquid chamber communicates with the lower damper liquid chamber through an orifice. An upper elastic film, disposed inside the upper vibration-preventing rubber member, has a portion spliced to the partition wall and its outer end part caulked to the upper plate. The upper damper liquid chamber is defined by the upper vibration-preventing rubber member and the upper elastic film. A lower elastic film, disposed inside the lower vibration-preventing rubber member, has a portion spliced to the partition wall and an outer end part caulked to the lower plate. The lower damper liquid chamber is defined by the lower vibration-preventing rubber member and the lower elastic film.

16 Claims, 7 Drawing Figures

VIBRATION PREVENTING DEVICE

FIELD OF THE INVENTION

This invention relates to a mounting cushion which is used when a heavy article such as cabin is placed and fixed on, for example, the frame of an automobile.

BACKGROUND OF THE INVENTION

When the body of a cabin or the like is placed and fixed on the frame of an automobile, vibration-preventing rubber devices are interposed between the frame and the body so as to absorb and dampen vibrations. Thus, vibrations transmitted from tires to the frame during operation of the automobile may be prevented from propagating to the body.

In general, vibrations originating during the operation of vehicles have high and medium frequencies. Therefore, vibration-preventing devices having comparatively small spring constants are usually used to prevent vibrations. Such vibration-preventing devices, however, do not satisfactorily dampen vibrations in a low-frequency region, such as, for example, vibrations attributable to undulations of the surface of a bad road. Multiple mounting type vibration-preventing devices have been developed which not only absorb high- and medium-frequency vibrations but also dampen low-frequency vibrations.

A multiple mounting vibration-preventing device 1 is disclosed, for example, in the official gazette of Japanese Utility Model Registration Application No. 59-231236 and depicted in FIG. 7. A middle supporter 4 is sandwiched between an upper supporter 2 and a lower supporter 3. The supporters 2, 3 and 4 are fitted snugly on an inner cylinder 5, and are held therebetween by the inner cylinder 5 and a bolt 6. The outer peripheral part of the lower end of an upper vibration-preventing rubber member 8, attached to an upper plate 7, is caulked and sealingly fixed betwen the upper supporter 2 and the middle supporter 4, and the outer peripheral end of the upper plate 7 is caulked and sealingly fixed to an upper outer cylinder 9. The outer peripheral part of the upper end of a lower vibration-preventing rubber member 11, attached to a lower plate 10, is caulked and sealingly fixed between the lower supporter 3 and the middle supporter 4. The outer peripheral end of the lower plate 10 is caulked and sealingly fixed to a lower outer cylinder 12.

The flange portion 13 of the upper outer cylinder 9 and the flange portion 14 of the lower outer cylinder 12 are sealingly fixed by welding or the like. An upper damper liquid chamber 16 and a lower damper liquid chamber 17 are defined by a partition wall made of rubber 15 which is interposed between the middle supporter 4 and the upper outer cylinder 9. The upper damper liquid chamber 16 and the lower damper liquid chamber 17 communicate through an orifice 18 provided in the middle supporter 4.

The high-frequency and medium-frequency vibrations are absorbed by the vibration-preventing members 8 and 11, while the low-frequency vibrations are dampened by the flow of a damper liquid between the upper and lower damper liquid chambers 16 and 17. The low-frequency vibrations are carried by the relative up and down motion of the outer cylinders 9, 12 and the middle supporter 4, and are attenuated under the damping action of the orifice 18. The damper liquid is a noncompressible fluid such as a coolant.

The relationship between a frequency corresponding to a peak damping coefficient, namely, the resonance frequency $f_n$ of the damper liquid within the orifice 13, the volume modulus $k_1$ of the upper damper liquid chamber 9, the volume modulus $k_2$ of the lower damper liquid chamber 12, the aperture area S of the orifice 13, the length l of the orifice 13, and the specific gravity $\rho$ of the damper liquid, is as follows:

$$f_n \sqrt{S(k_1 + K_2/\rho l}$$

That is, the resonance frequency $f_n$ of the damper liquid may be lowered by reducing the aperture area S of the orifice 13, lowering the volume moduli $k_1$ and $k_2$ of the respective damper liquid chambers 9 and 12, or increasing the length l of the orifice 13.

In the prior-art vibration-preventing device, the outer peripheral part of the lower end of the upper vibration-preventing rubber member 8 is caulked between the upper supporter 2 and the middle supporter 4, while the outer peripheral part of the upper end of the lower vibration-preventing rubber member 11 is caulked between the lower supporter 3 and the middle supporter 4. The outer peripheral ends of the upper plate 7 and the lower plate 10 are caulked to the corresponding outer cylinders 9 and 12, respectively. Thus, it is necessary to caulk in four places. Such a structure is disadvantgeous because it is complicated and inefficient to assemble.

As stated above, the length l of the orifice 18 may be increased or the aperture area S thereof may be reduced to lower the resonance frequency $f_n$ of the damper liquid within the orifice 18. However, the length l has an upper limit based on the size of the vibration-preventing rubber device 1. Also, when the aperture area S is smaller than a predetermined value, flow resistance increases, and the peak value of the damping coefficient disadvantageously decreases.

To set the resonance frequency $f_n$ at a desired value, the volume moduli $k_1$ and $k_2$ of the respective damper liquid chambers 16 and 17 may be varied. However, the volume moduli $k_1$ and $k_2$ of the damper liquid in the damper liquid chambers 16 and 17 are determined by the volume moduli of the upper vibration-preventing rubber member 11, and the volume moduli of the vibration-preventing rubber members 8 and 11 is limited because these members 8 and 11 must support a static load applied from above to absorb the high-frequency and medium-frequency vibrations. It is therefore difficult to set the resonance frequency $f_n$ at the desired value.

As a result, in the prior-art vibration-preventing device 1, the damping function for the low-frequency vibrations is not satisfactory.

SUMMARY OF THE INVENTION

This invention was developed in view of the foregoing background and to overcome the foregoing drawbacks.

It is accordingly an object of this invention to provide a vibration-preventing device having a simple structure and which is efficient to assemble. Further, the dynamic characteristics for low-frequency vibrations are improved thus enhancing the riding comfort of an automobile.

These objects are achieved by providing a vibration-preventing device which includes an inner cylinder connected to an upper plate and a lower plate. A partition wall is provided outside of the inner cylinder between the upper plate and lower plate. An upper vibration preventing rubber member and an upper elastic film are provided outside of the inner cylinder between the partition wall and the upper plate. A base portion of the upper elastic film is spliced to the partition wall and an outer end of the elastic film is caulked and fixed to the upper plate. An upper damper liquid chamber is defined by at least the upper vibration-preventing rubber member and the upper elastic film. Preferably, the partition wall also cooperates to define the upper damper liquid chamber.

Similarly, a lower vibration preventing rubber member and a lower elastic film are provided outside of the cylinder between the partition wall and the lower plate. A base portion of the lower elastic film is spliced to the partition wall and an outer end of the lower elastic film is caulked and fixed to the lower plate. A lower damper liquid chamber is defined at least by the lower elastic film and lower vibration preventing rubber member, and preferably also by the partition wall. The lower and upper damper liquid chambers are held in communication by an orifice.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements, and wherein.

DETAILED DESCRIPTION OF THE PREFERRED EMBODIMENT

The present invention will be described in detail with reference to the accompanying drawings which illustrate a preferred embodiment according to the present invention.

Figure 1:
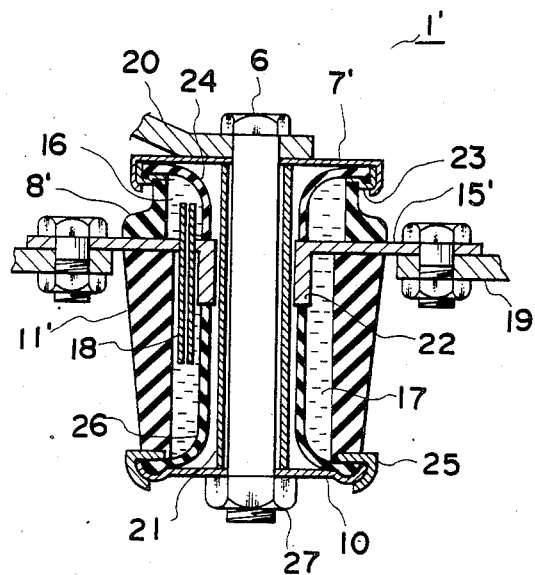
FIG. 1 is a cross-sectional view showing the vibration-preventing device according to one embodiment of this invention.
Figure 3:
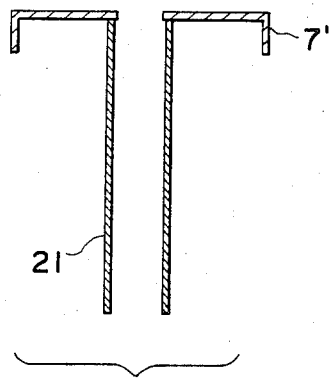
FIGS. 2 and 3 are cross-exploded sectional views portions of the embodiment shown in FIG. 1.
Figure 2:
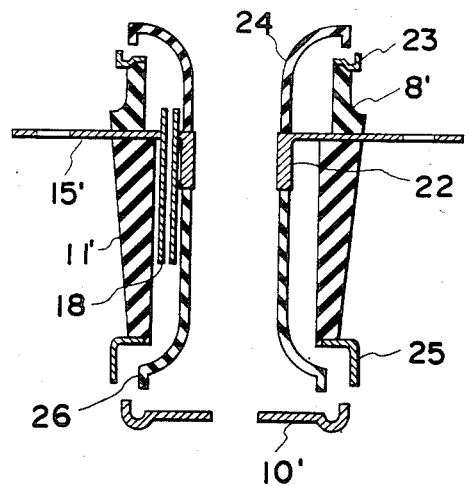
Figure 7:
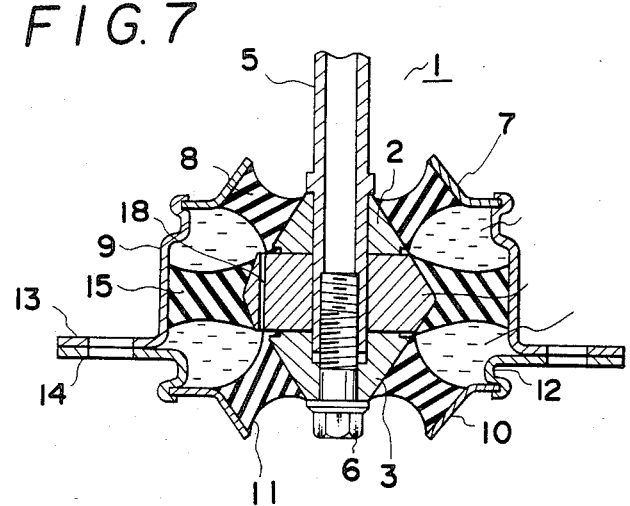
FIG. 7 is a vertical cross-sectional view corresponding to FIG. 1, showing a prior art vibration-preventing rubber device.

Referring to FIG. 1, 1' denotes a vibration-preventing device according to one embodiment of this invention. This embodiment is used, for example, when the cabin 20 of a truck is placed and fixed on the frame 19 thereof. In the vibration-preventing device 1', an upper plate 7 having an outer end which is substantially L-shaped in vertical cross-section is connected through an inner cylinder 21 to a lower plate 10' having an outer end recess which is substantially U-shaped in vertical section.

A partition wall 15' having a hub 22 positioned outside the inner cylinder 21, is interposed between the upper plate 7' and the lower plate 10'. An vibration-preventing rubber member 8', which is in the shape of a ring and which is provided at its upper end with a fixture 23 substantially U-shaped in vertical section, is interposed between the partition wall 15' and the upper plate 7'. An upper elastic film 24, having a volume modulus smaller than that of the upper vibration-preventing rubber member 8', is sealingly fixed inside the upper vibration-preventing rubber member 8' as follows. The lower end of upper elastic film 24 is vulcanized and spliced to the upper part of the hub 22 of the partition wall 15', while the upper outer end thereof is sandwiched between the fixture 23 of the upper vibration-preventing rubber member 8' and the upper plate 7. The L-shaped outer end of the upper plate 7' is caulked.

A lower vibration-preventing rubber member 11', which is in the shape of a ring and which is provided at its lower end with a fixture 25 of inverted L-shaped vertical cross-section, is interposed between the lower plate 10' and the partition all 15'. A lower elastic film 26, having a volume modulus smaller than that of the lower vibration-preventing rubber member 11' as follows. The upper end of the lower elastic film 26 is vulcanized and spliced to the lower part of the hub 22 of the partition wall 15', while the lower outer end thereof is sandwiched between the fixture 25 of the lower vibration-preventing rubber member 11' and the outer end recess of the lower plate 10'. The fixture 25 is caulked.

An upper damper liquid chamber 16, defined by upper vibration-preventing rubber member 8', the upper elastic film 24 and partition wall 15', communicates with a lower damper liquid chamber 17, defined by lower vibration-preventing rubber member 11', lower elastic film 26 and partition wall 15', through an orifice 18 provided in the partition wall 15'. A damper liquid, such as coolant, is tightly sealed in the chambers.

The outer peripheral parts of the partition wall 15' of vibration-preventing device 1' is clamped to the frame 19 by bolts and nuts, and the cabin 20, placed on the upper plate 7', is fixed by a bolt 6 and a nut 27 inserted through the inner cylinder 21.

In above construction, the volume modulus of the upper elastic film 24 is smaller than that of the upper vibration-preventing rubber member 8', and the volume modulus of the lower elastic film 26 is smaller than that of the lower vibration-preventing rubber member 11'. Thus, the volume moduli of the upper damper liquid chamber 16 and the lower damper liquid chamber 17 can be small. As a result, the resonance frequency $f_n$ of the damper liquid within the orifice 18 is low, whereby low-frequency vibrations are satisfactorily dampened during operation of the vehicle thereby enhancing the riding comfort of the vehicle.

Figure 4:
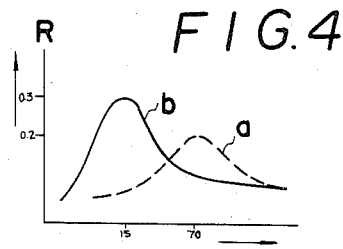
FIG. 4 is a graph showing the correlation between the damping coefficient and the frequency of vibrations.

FIG. 4 is a graph showing the correlation between the damping coefficient R shown on the ordinate axis and the frequency [Hz], shown on the abscissa. Broken line a corresponds to the prior art vibration-preventing rubber device 1, while solid line b corresponds to the vibration-preventing device 1' according to this invention.

Moreover, since the shapes and materials of the vibration-preventing rubber members 8' and 11' are not limited by the volume moduli, the dynamic spring constants thereof can be small so as to absorb high-frequency vibrations while holding a static load bearing capability. Vibration-preventing members 8' and 11' can also satisfactorily absorb high-frequency and medium-frequency vibrations during operation of the vehicle. Therefore, the riding comfort and quiet of the vehicle are enhanced.

Figure 5:
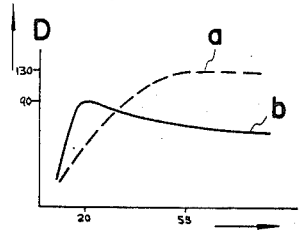
FIG. 5 is a graph showing the correlation between the dynamic spring constant of the vibration-preventing device and the frequency of vibrations.

FIG. 5 is a graph showing the correlations between the dynamic spring constant D, shown on the ordinate axis, and the frequency [Hz], shown on the abscissa. Broken line a corresponds to the prior art vibration-preventing rubber device 1, while solid line b corresponds to the vibration-preventing rubber device 1' according to this invention.

As described above, the vibration-preventing rubber members 8' and 11' satisfactorily absorb the high-frequency and medium-frequency vibrations, and the damper liquid satisfactorily dampens the low-frequency vibrations. Thus, the vibration-preventing rubber device 1' can lower the transmission of vibrations in a wide range of frequencies.

Figure 6:
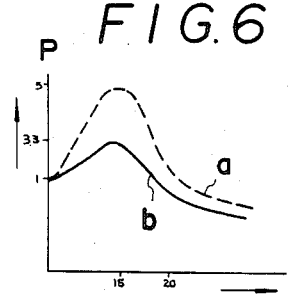
FIG. 6 is a graph showing the correlation between the vibration transmission factor and the frequency of vibrations.

FIG. 6 is a graph showing the correlation between the vibration transmission factor P, shown on the ordinate axis and the frequency [Hz], shown on the abscissa. Broken line a corresponds to the prior-art vibration-preventing rubber device 1 and solid line b corresponds to the vibration-preventing rubber device 1' according to this invention.

Only two portions (the outer end of the upper plate 7' and the outer end of the lower plate 10') of the vibration-preventing rubber device 1' of this invention need to be caulked. Thus, assembly of the device as facilitated and the reliability of the sealing of the damper liquid is enhanced.

This invention is not restricted to the foregoing embodiment, but various aspects can be adopted.

As described above, according to this invention, a vibration-preventing rubber device can satisfactorily absorb and dampen high-frequency, medium-frequency and low-frequency vibrations, thereby ensuring increased riding comfort and reducing noise inside and outside the car. Further, assembly of the vibration-preventing rubber device is facilitated and reliability is increased.

More specifically, a partition wall is interposed between an upper plate and a lower plate, an upper vibration-preventing rubber member is interposed between the partition wall and the upper plate, and an upper elastic film, disposed inside the upper vibration-preventing rubber member, is sealingly fixed with its base part spliced to the partition wall and its outer end caulked to the upper plate. An upper damper liquid chamber is thereby defined. A lower vibration-preventing rubber member is interposed between the partition wall and the lower plate, and a lower elastic film, disposed inside the lower vibration-preventing rubber member, is sealingly fixed with its base part spliced to the partition wall and its outer end caulked to the lower plate. A lower damper liquid chamber is thereby defined. Only two portions in the vibration-preventing device need to be caulked. Thus, assembly of the device is facilitated and the reliability of the sealing of the damper liquid is enhanced.

The volume moduli of the upper damper liquid chamber and the lower damper liquid chamber, which communicate through the orifice, can be set by selecting the volume moduli of the upper and lower volume-preventing rubber members and the upper and lower elastic films, and thus the resonance frequency of a damper liquid within the orifice can be predetermined.

Accordingly, a low resonance frequency can be set and a large peak value of a damping coefficient can be set without reducing the aperture area of the orifice, thus providing a satisfactory damping of vibrations during operation of the vehicle thereby enhancing the riding comfort of the vehicle.

Further, since the shapes and materials of the vibration-preventing rubber members can be set without being limited by the volume moduli, the dynamic spring constants of the rubber members can be small for high-frequency vibrations while maintaining a static load bearing capability, and they can satisfactorily absorb high-frequency and medium-frequency vibrations during vehicle operation. Thus, the riding comfort of the vehicle is enhanced.

The vibration-preventing rubber device satisfactorily absorbs and dampens high-frequency, medium-frequency and low-frequency vibrations thereby reducing noise inside and outside the car during operation.

While the preferred embodiment of the present invention has been described, it is to be understood that the invention is not limited thereto, and may be otherwise embodied within the scope of the following claims.

What is claimed is:

1. A vibration-preventing device comprising:
   an inner cylinder;
   an upper plate;
   a lower plate;
   a partition wall positioned outside said inner cylinder and interposed between said upper plate and said lower plate, said upper plate and said lower plate being connected to said inner cylinder;
   an upper vibration-preventing rubber member interposed between said partition wall and said upper plate;
   an upper elastic film disposed between said cylinder and said upper vibration-preventing rubber member;
   an upper damper liquid chamber being defined by said upper vibration-preventing rubber member and said upper elastic film;
   a lower vibration-preventing rubber member interposed between the partition wall and the lower plate;
   a lower elastic film disposed between said cylinder and said lower vibration-preventing rubber member;
   a lower damper liquid chamber being defined by said lower vibration-preventing rubber member and said lower elastic film; and
   an orifice extending through said partition wall, said upper damper liquid chamber communicating with said lower damper liquid chamber through said orifice;
   wherein said partition wall separates said upper elastic film completely from said lower elastic film, and said partition wall further separates said upper damper liquid chamber from said lower damper liquid chamber.

2. The vibration-preventing device according to claim 1, wherein a volume modulus of said upper elastic film is smaller than a volume modulus of said upper vibration-preventing rubber member.

3. The vibration-preventing device according to claim 1, wherein a volume modulus of said lower elastic film is smaller than a volume modulus of said lower vibration-preventing rubber member.

4. The vibration-preventing device of claim 1, wherein said upper elastic film includes a base, said base of said upper elastic film being spliced to said partition wall.

5. The vibration-preventing device of claim 1, wherein said lower elastic film includes a base, said base of said lower elastic film being spliced to said partition wall.

6. The vibration-preventing device according to claim 1, wherein said upper elastic film includes an outer end which is caulked, said outer end being fixed to said upper plate.

7. The vibration-preventing device according to claim 1, wherein said lower elastic film includes an outer end which is caulked, said outer end being fixed to said lower plate.

8. The vibration-preventing device according to claim 1, wherein said partition wall also cooperates to define said lower damper liquid chamber.

9. The vibration-preventing device according to claim 1, wherein said partition wall also cooperates to define said upper damper liquid chamber.

10. The vibration preventing device of claim 1, wherein each damper liquid chamber is located between a vibration-preventing rubber member and an elastic film, and an air space separated said inner cylinder from each elastic film.

11. A vibration-preventing device comprising:
an inner cylinder;
an upper plate;
a lower plate;
a partition wall positioned outside said inner cylinder and interposed between said upper plate and said lower plate, said upper plate and said lower plate being connected to said inner cylinder;
an upper vibration-preventing rubber member interposed between said partition wall and said upper plate;
an upper elastic film disposed between said cylinder and said upper vibration-preventing rubber member, said upper elastic film including a base portion and an outer portion, said base portion being spliced to said partition wall, said outer portion being caulked and being fixed to said upper plate;
an upper dampr liquid chamber being defined by said upper vibration-preventing rubber member, said partition wall and said upper elastic film;
a lower vibration-preventing rubber member interposed between the partition wall and the lower plate;
a lower elastic film disposed between said cylinder and said lower vibration-preventing rubber member, said lower elastic film including a base portion and an outer end, said base portion being spliced to said partition wall, said outer end being caulked and being fixed to said lower plate;
a lower damper liquid chamber being defined between said partition wall, said lower vibration-preventing rubber member and said lower elastic film; and
an orifice extending through said partition wall, said upper damper liquid chamber communicating with said lower damper liquid chamber through said orifice;
wherein said partition wall separates said upper damper liquid chamber from said lower damper liquid chamber and further separates said upper elastic film completely from said lower elastic film.

12. The vibration-preventing device according to claim 11, wherein a volume modulus of said upper damper liquid chamber is low.

13. The vibration-preventing device according to claim 11, wherein a volume modulus of said lower damper liquid chamber is low.

14. The vibration-preventing device according to claim 11, wherein a volume modulus of said upper elastic film is smaller than a volume modulus of said upper vibration-preventing rubber member.

15. The vibration-preventing device according to claim 11, wherein a volume modulus of said lower elastic film is smaller than a volume modulus of said lower vibration-preventing rubber member.

16. The vibration preventing device of claim 11, wherein each damper liquid chamber is located between a vibration preventing rubber member and an elastic film, and an air space separates said inner cylinder from each elastic film.

* * * * *